United States Patent
Drysdale et al.

(10) Patent No.: US 8,983,049 B2
(45) Date of Patent: Mar. 17, 2015

(54) METHODS AND SYSTEMS FOR CONTROLLING A USER DEVICE IN A TELECOMMUNICATION NETWORK

(71) Applicant: Metaswitch Networks Ltd., Enfield (GB)

(72) Inventors: David Matthew Drysdale, London (GB); Alan Cook, Enfield (GB); Christopher John Mairs, Enfield (GB); Jonathan Thomas Rowland, Enfield (GB); Lionel James Jerome Lee, Enfield (GB); Douglas Gavin Currie, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

(21) Appl. No.: 13/777,819

(22) Filed: Feb. 26, 2013

(65) Prior Publication Data

US 2014/0079203 A1    Mar. 20, 2014

Related U.S. Application Data

(60) Provisional application No. 61/603,873, filed on Feb. 27, 2012.

(51) Int. Cl.
*H04M 3/42* (2006.01)
*H04L 12/66* (2006.01)
(Continued)

(52) U.S. Cl.
CPC ............ *H04M 3/005* (2013.01); *H04M 7/0057* (2013.01); *H04L 65/1016* (2013.01);
(Continued)

(58) Field of Classification Search
USPC .............. 370/331, 401; 379/207.02; 455/436, 455/439
See application file for complete search history.

(56) References Cited

U.S. PATENT DOCUMENTS

| | | | |
|---|---|---|---|
| 2009/0129296 A1* | 5/2009 | Grinshpun et al. | ........... 370/261 |
| 2010/0081428 A1 | 4/2010 | Maejima et al. | |
| 2011/0280239 A1 | 11/2011 | Tung et al. | |

FOREIGN PATENT DOCUMENTS

| | | |
|---|---|---|
| EP | 1622315 A1 | 2/2006 |
| GB | 2464748 A | 4/2010 |

(Continued)

OTHER PUBLICATIONS

Murph, "iCall enables seamless GSM to WiFi switching on iPhone", Jun. 6, 2008 (last visited Feb. 26, 2013), http://www.engadget.com/2008/06/06/icall-enables-seamless-gsm-to-wifi-switching-on-iphone/.

(Continued)

*Primary Examiner* — Harry S Hong
(74) *Attorney, Agent, or Firm* — EIP US LLP

(57) ABSTRACT

A method of controlling a user device in a telecommunications network having a first part and a second, different part is provided. The method includes, at the user device, receiving a first communication session setup request to set up a given communication session, the first communication session setup request being directed to a first communication interface, receiving a communication notification in relation to the same given communication session, the communication notification being directed to a second communication interface, establishing the given communication session via the first communication interface via the first part of the telecommunications network, and after having established the given communication session via the first communication interface, activating an alert function to alert a user of the user device to the availability of the second communication interface at least on the basis of having received the communication availability notification.

21 Claims, 8 Drawing Sheets

(51) Int. Cl.
    *H04W 36/00*     (2009.01)
    *H04M 3/00*     (2006.01)
    *H04M 7/00*     (2006.01)
    *H04L 29/06*     (2006.01)

(52) U.S. Cl.
    CPC ........ *H04L65/1006* (2013.01); *H04L 65/1053* (2013.01); *H04L 65/1069* (2013.01); *H04L 65/1036* (2013.01); *H04M 3/42* (2013.01); *H04M 7/006* (2013.01)
    USPC ....... 379/207.02; 370/331; 370/401; 455/439

(56) References Cited

FOREIGN PATENT DOCUMENTS

| | | |
|---|---|---|
| WO | 2007/111860 A2 | 10/2007 |
| WO | 2009/067172 A1 | 5/2009 |
| WO | 2011/082181 A1 | 7/2011 |

OTHER PUBLICATIONS

Search Report issued in related application No. GB1303443.4 on Jun. 10, 2013.

* cited by examiner

METHODS AND SYSTEMS FOR CONTROLLING A USER DEVICE IN A TELECOMMUNICATION NETWORK

CROSS-REFERENCE TO RELATED APPLICATIONS

This application claims priority to U.S. Patent Application Ser. No. 61/603,873, entitled "Communication System," filed on Feb. 27, 2012, the content of which is incorporated herein by reference in its entirety.

TECHNICAL FIELD

The present invention relates to controlling a user device in a telecommunications network, and in particular to providing alerts to a user of such a user device to indicate when an alternative communication interface is available

BACKGROUND

Telephony users have long had to deal with a proliferation of user devices (sometimes referred to as 'user equipment' or 'endpoints') through which third parties may contact them. For example, a user might have a fixed-line (or 'wireline') telephony user device for use at home, a further fixed-line telephony user device for use in the office, and a mobile telephony user device for use whilst on the move. Each type of telephony device has associated advantages; whilst a mobile telephony device provides the user with mobility, a fixed-line telephony device can provide more reliable communications with no battery recharge concerns.

Users may also have a number of different access technologies available through which their telephony user devices may conduct communications. For example, a telephony user device may be equipped with a circuit-switched communication interface and one or more circuit-switched communication clients for conducting communications via suitable circuit-switched networks. Likewise, a telephony user device may also/alternatively be equipped with a packet-switched communication interface and one or more packet-switched communication clients for communicating via suitable packet-switched networks.

A circuit-switched telephony device may comprise a fixed-line Plain Old Telephone Service (POTS) telephone equipped with a circuit-switched interface and communication client for conducting communications via a Public Switched Telephone Network (PSTN). A circuit-switched telephony user device may comprise a mobile (or 'cellular') telephone equipped with a wireless circuit-switched interface and communication client for conducting communications via a cellular network such as a Global System for Mobile Communications (GSM) network or Code Division Multiple Access (CDMA) network.

More recently, packet-switched telephony devices have proliferated which may take the form of a fixed-line Internet Protocol (IP) telephone equipped with a fixed-line packet-switched interface and communication client for communicating via an Internet Protocol (IP) network, such as the internet or an IP Private Branch Exchange (IP-PBX). Similarly, a user may conduct communications via a personal computer (PC) equipped with a packet-switched communication client for conducting communications over the internet via a fixed-line internet connection. A mobile packet-switched telephony device may take the form of a portable computing device, such as a laptop or tablet, equipped with a wireless packet-switched interface and communication client for communicating via an IP network, such as the internet, using a WiFi™ or Bluetooth™ compliant wireless access point. A packet-switched communication client may conduct communications according to an internet telephony protocol, commonly referred to as Voice over Internet Protocol (VoIP), with associated setup and/or control protocols such as the Session Initiation Protocol (SIP) or H.323.

Increasingly, telephony user devices are available that are equipped with multiple communication interfaces to facilitate communication via multiple access technologies. For example, a modern "smartphone" is typically equipped with a circuit-switched interface for communicating via a cellular network and a packet-switched interface for communicating via the internet. Commonly, a smartphone may be equipped with several packet-switched interfaces, for example, a short-range radio interface, e.g. WiFi or Bluetooth™ compliant, and/or or via an interface for communication of packet data through a cellular network, such as 3rd Generation Partnership Project (3GPP) Long Term Evolution (LTE), LTE-Advanced (LTE-A), High Speed Packet Access (HSPA), Wideband Code Division Multiple Access (W-CDMA) or Mobile WiMax etc. In such cases, a packet-switched communication client may also be deployed for conducting communications via one or more of the available wireless packet-switched interfaces. In cases such as this where a device is equipped with more than one communication client, the various clients deployed in that device are referred to as co-located. A suitable packet-switched communication client may be deployed on a user equipment prior to sale, or could be deployed subsequently through an application distribution portal such as the Apple® App Store$^{SM}$ or Android™ Market etc.

To avoid confusing calling parties with identifiers such as telephone dialling numbers for each of the various communication clients of a user, a one-telephone dialling number telephony service allows the user to publish a single telephone dialling number on which they can be contacted. Using a simultaneous ringing service, when the single telephone dialling number is called, more than one of the user's communication clients will ring simultaneously. The user is then able to answer the call using the communication client of his choosing.

It would therefore be desirable to provide improved methods, systems and apparatuses for controlling a user device under such circumstances.

SUMMARY

In accordance with one aspect of the present invention, there is provided a method of controlling a user device in a telecommunications network, the user device comprising at least a first communication interface capable of communicating via a first part of the telecommunications network and a second communication interface capable of communicating via a second, different part of the telecommunications network, the method comprising, at the user device:
  receiving a first communication session setup request to set up a given communication session, the first communication session setup request being directed to the first communication interface;
  receiving a communication notification in relation to the same given communication session, the communication notification being directed to the second communication interface;
  establishing the given communication session via the first communication interface via the first part of the telecommunications network; and after having established the given communication session via the first communication interface, activating an alert function to alert a user of the user device to the availability of the second communication interface at least on the basis of having received the communication availability notification.

In accordance with a second aspect of the present invention, there is provided an apparatus for use in controlling a user device in a telecommunications network, the user device comprising at least a first communication interface capable of communicating via a first part of the telecommunications network and a second communication interface capable of communicating via a second, different part of the telecommunications network, the apparatus comprising a processing system adapted to:
  receive a first communication session setup request to set up a given communication session, the first communication session setup request being directed to the first communication interface;
  receive a communication notification in relation to the same given communication session, the communication notification being directed to the second communication interface;
  establish the given communication session via the first communication interface via the first part of the telecommunications network; and
  after having established the given communication session via the first communication interface, activate an alert function to alert a user of the user device to the availability of the second communication interface at least on the basis of having received the communication availability notification.

In accordance with a third aspect of the present invention, there is provided a computer program product comprising a non-transitory computer-readable storage medium having computer readable instructions stored thereon, the computer readable instructions being executable by a computerized device to cause the computerized device to perform a method of controlling a user device in a telecommunications network, the user device comprising at least a first communication interface capable of communicating via a first part of the telecommunications network and a second communication interface capable of communicating via a second, different part of the telecommunications network, the method comprising, at the user device:
  receiving a first communication session setup request to set up a given communication session, the first communication session setup request being directed to the first communication interface;
  receiving a communication notification in relation to the same given communication session, the communication notification being directed to the second communication interface;
  establishing the given communication session via the first communication interface via the first part of the telecommunications network; and
  after having established the given communication session via the first communication interface, activating an alert function to alert a user of the user device to the availability of the second communication interface at least on the basis of having received the communication availability notification.

In accordance with a fourth aspect of the present invention, there is provided a method of controlling a given communication session in a telecommunications network between a first communication device associated with a first party and a second communication device associated with a second party, the first communication device comprising at least a first communication interface capable of communicating via a first part of the telecommunications network and a second communication interface capable of communicating via a second, different part of the telecommunications network, the method comprising, at a call control system in the telecommunications network:
  transmitting a first communication session setup request to set up the given communication session, the first communication session setup request being directed to the first communication interface on the first communication device;
  transmitting a communication notification in relation to the same given communication session, the communication notification being directed to the second communication interface on the first communication device;
  establishing a first communication session leg between an intermediate node in the telecommunications network and the first communication device via the first communication interface and the first part of the telecommunications network;
  after having established the first communication session leg to the first communication interface, receiving a communication session transfer request; and
  establishing a second communication session leg between an intermediate node in the telecommunications network and the first communication device via the second communication interface and the second part of the telecommunications network in response to receiving the communication session transfer request.

In accordance with a fifth aspect of the present invention, there is provided a method of controlling a user device in a telecommunications network, said user device comprising at least a first communication interface capable of communicating via a first part of said telecommunications network and a second communication interface capable of communicating via a second, different part of said telecommunications network, said method comprising, at said user device:
  receiving a first communication session setup request to set up a given communication session, said first communication session setup request being directed to said first communication interface;
  receiving a communication notification in relation to the same given communication session, said communication notification being directed to said second communication interface;
  establishing the given communication session via said first communication interface via the first part of said telecommunications network; and
  after having established the given communication session via said first communication interface, transferring the given communication session to said second communication interface at least on the basis of having received said communication availability notification.

Further features and advantages of the invention will become apparent from the following description of preferred embodiments of the invention, given by way of example only, which is made with reference to the accompanying drawings.

DETAILED DESCRIPTION

Figure 1:
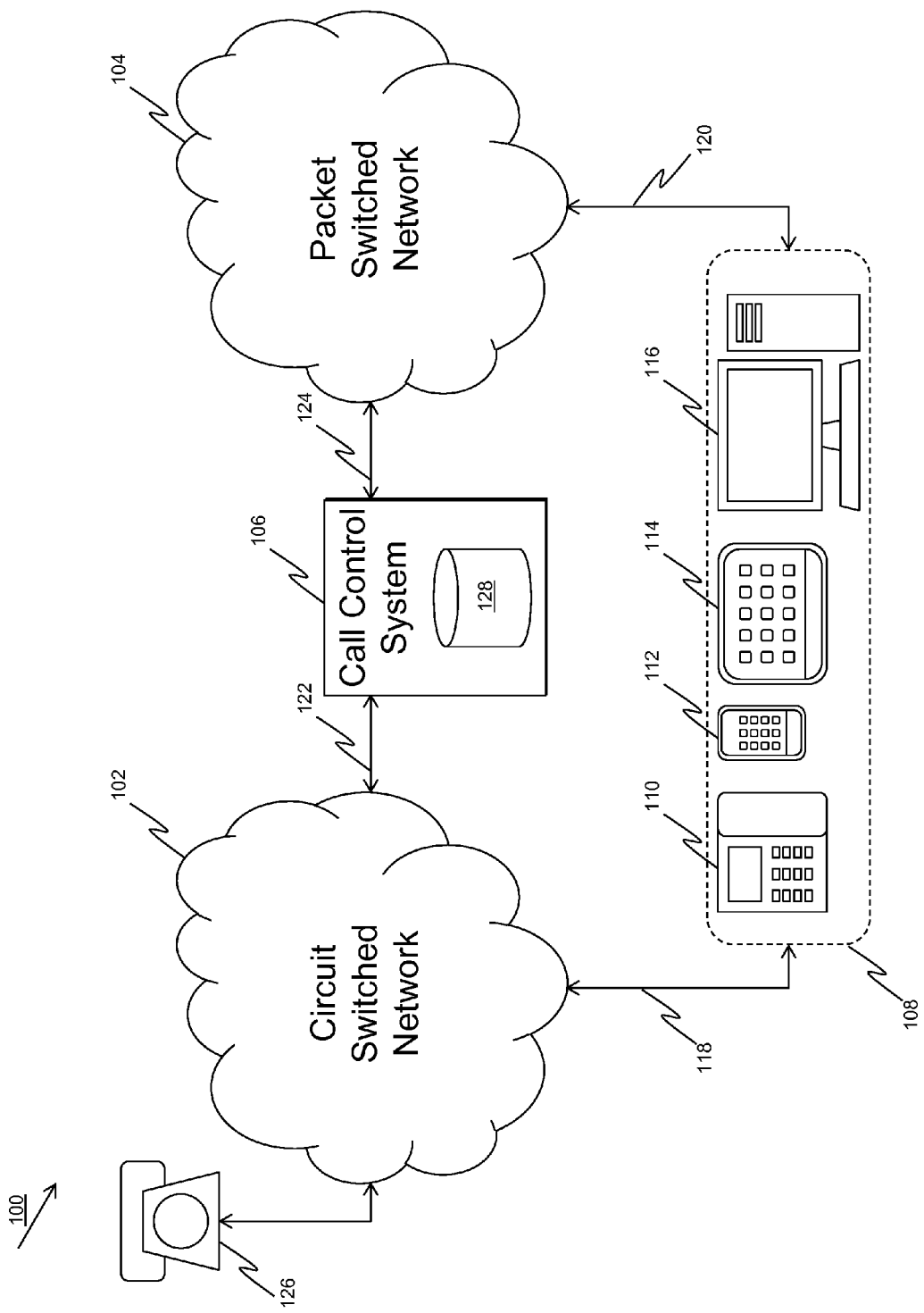
FIG. 1 shows an exemplary telecommunications network in which embodiments of the present disclosure can be employed.

FIG. 1 shows an exemplary telecommunications network 100 in which embodiments of the present disclosure can be employed. Telecommunications network 100 includes a circuit-switched telecommunications network part 102, a packet-switched network part 104 and may include other network parts (not shown). According to embodiments, a client-shared telephony service is hosted and controlled by a call control system 106.

A user of the client-shared telephony service may have a number of communication devices 108 through which they may conduct communications via the service. The various communication devices 108 through which a user can conduct communications via the service are considered to be associated with that user. The user's associated communication devices 108 may include, for example, desk phone 110, mobile (or 'cellular') telephone 112, tablet 114 and/or personal computer 116.

Each of the user's communication devices is equipped with one or more interfaces and one or more communication clients for conducting communications in telecommunications network 100. Communication devices equipped with a circuit-switched interface and communication client are adapted to conduct communications in telecommunications network 100 via link 118 with circuit-switched network 102. The circuit-switched interface may comprise a landline PSTN interface in the case of a fixed-line device such as desk phone 110, or a cellular radio telephony interface in the case of a mobile device such as mobile telephone 112. Communication devices equipped with a packet-switched interface and communications client are adapted to conduct communications in telecommunications network via link 120 with packet-switched network 104. This packet-switched interface could comprise a wired interface to the internet in the case of a fixed line device such as personal computer 116, or a wireless interface (e.g. WiFi, Bluetooth, 3G-LTE, WiMax, etc.) to the internet in the case of a mobile device such as tablet 114. The packet-switched interface may comprise an Ethernet part.

Some communication devices may be equipped with multiple communication clients. For example, in addition to the aforementioned circuit-switched communication client and associated interface, mobile telephone 112 may also be equipped with one or more packet-switched communications clients and interfaces for conducting communications with packet-switched network 104 via link 120. In this case, the multiple communication clients equipped on mobile telephone 112 are referred to as co-located communication clients, i.e. multiple communication clients on a single device.

Call control system 106 comprises a user database 128 for storing data associated with users of the client-shared telephony service. Although depicted in FIG. 1 as a single network entity located in-between circuit-switched network part 102 and packet-switched network part 104, call control system 106 may comprise a plurality of network entities, with elements located within circuit-switched network part 102 and/or packet-switched network part 104 or one or more other networks (not shown). In some embodiments, user database 128 includes a list of identifiers for the communication clients equipped to the various communication devices 108 associated with a given user. User database 128 may also store a user profile associated with each user, which contains a number of user configurable preferences, such as call routing preferences.

Each of the communication clients equipped to the various communication devices 108 associated with a given user are likely to have intermittent connectivity to call control system 106, and therefore are only intermittently able to conduct communications. This may be due to the devices being powered off for limited periods. Alternatively this may be due to mobility when connecting to telecommunications network 100 via a wireless interface, for example by moving in and out of range of the various cells and access points or interference from other wireless communication equipment etc. Further, there could be temporary problems with local or centralised network infrastructure in telecommunications network 100, such as downtime due to maintenance work or power outages.

From the perspective of call control system 106, the communication clients on the various communication devices 108 associated with a given user can be considered to have intermittent availability. According to embodiments, user database 128 is further configured to store the availability of any clients associated with a given user. According to some embodiments, this is achieved by configuring each communication client to periodically send a message (referred to herein as a heartbeat message) to call control system 106. If such a heartbeat message is not received by call control system 106, that client can be considered unavailable until a subsequent message is successfully received. Alternatively, in other embodiments, call control system 108 is adapted to periodically "poll" each communication client to probe for its availability using a request response protocol.

A communication session between a communication client on one of the user's devices 108 and a communication client on a device of a remote party 126 can be routed between circuit-switched network 102 and call control system 106 via link 122. Link 122 may for example comprise a SIP trunk, or other high capacity communications link. Similarly, communication sessions can be routed between packet-switched network 104 and call control system 106 via link 124. Link 122 and/or link 124 may comprise one or more gateway or session border controller entities (not shown) which carry out conversion between the various protocols and data formats used to transfer media data and signalling data in the different networks making up telecommunications network 100. For example, a media gateway (not shown) may convert between the different protocols of media data passing between circuit-switched network 102 and packet-switched network 104, such as packetised Voice over Internet Protocol (VoIP) data into Time-Division-Multiplexing (TDM) voice data and vice versa. A signalling gateway (not shown) may convert between the different protocols of signalling information passing between circuit-switched network 102 and packet-switched network 104, such as SIP, Signalling System 7 (SS7), Integrated Services Digital Network User Part (ISUP), American National Standards Institute (ANSI)-41, Mobile Application Part (MAP) formats, etc.

In order to provide the client-shared telephony service, circuit-switched network 102 is configured to route communication sessions between the user's devices 108 and a remote party device 126 via call control system 106. Call control system 106 may comprise a media gateway controller, service platform, call agent, application server or softswitch and may perform other functions typically associated with such entities.

Figure 2:
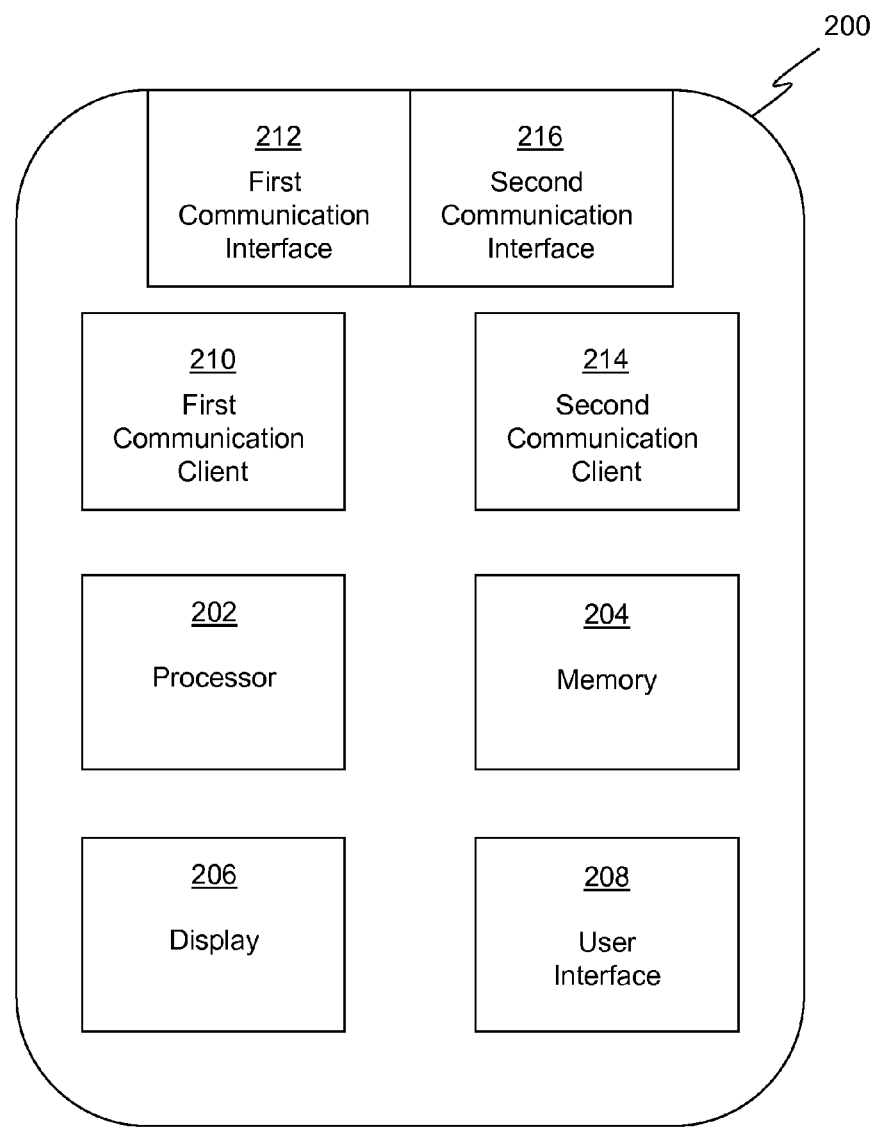
FIG. 2 shows an exemplary communication device adapted to conduct communication sessions such as voice calls in the telecommunication network according to embodiments.

FIG. 2 shows an exemplary communication device 200 adapted to conduct communication sessions such as voice calls in telecommunication network 100 according to embodiments. Communication device 200 may for example comprise mobile telephone 112 depicted in FIG. 1.

Communication device 200 comprises a processor 202 for carrying out data processing tasks of embodiments. Communication device 200 comprises a memory 204 for storing data associated with embodiments. Communication device 200 comprises a user interface 206 for collecting user input from a user of the device, including user input associated with setting up and acceptance of communication sessions, such as telephone dialling number digits or incoming call acceptance or rejection commands. In embodiments, communication device 200 also comprises a display 206. In some embodiments, user interface 206 may comprise a touch-screen layer overlaying display 206, upon which one or more touch-sensitive screen regions (or 'buttons') are configurable by processor 202.

Communication device 200 comprises a first communication client 210 adapted to communicate via a first part of telecommunications network 100 via a first communication interface 212. In some embodiments, first communication client 210 comprises a circuit-switched communication client adapted to communicate via a circuit-switched part 102 of telecommunications network 100. In such embodiments, first communication interface 212 is a circuit-switched communication interface.

In some embodiments, communication device 200 also comprises a second communication client 214 adapted to communicate via a second, different part of telecommunications network 100 via a second communication interface 216. In such embodiments, first communication client 210 and second communication client 214 are described as being co-located on communication device 200. In some embodiments, second communication client 214 comprises a packet-switched communication client adapted to communicate via a packet-switched part 104 of telecommunications network 100. In some such embodiments, second communication interface 216 is a packet-switched communication interface.

In some alternative embodiments, first communication client 210 and second communication client 214 are both packet-switched clients, adapted to communicate via a packet-switched part of telecommunications network 100. In further alternative embodiments, first communication client 210 and second communication client 214 are both circuit-switched clients, adapted to communicate via a circuit-switched part of telecommunications network 100.

In embodiments, first communication interface 212 and second communication interface 216 comprise one or more antennae for wireless radio communication, which may be shared between first communication interface 212 and second communication interface 216. In some such embodiments, first communication interface 212 and second communication interface 216 comprise a cellular radio modem and a non-cellular radio modem respectively.

In alternative embodiments, first communication interface 212 and second communication interface 216 comprise one or more hardware ports for fixed-line communication. In some such embodiments, first communication interface 212 comprises a PSTN port. In some such embodiments, second communication interface 216 comprises an Ethernet port.

Operation of the client-shared telephony service in telecommunications network 100 will now be described in relation to FIG. 3.

Figure 3:
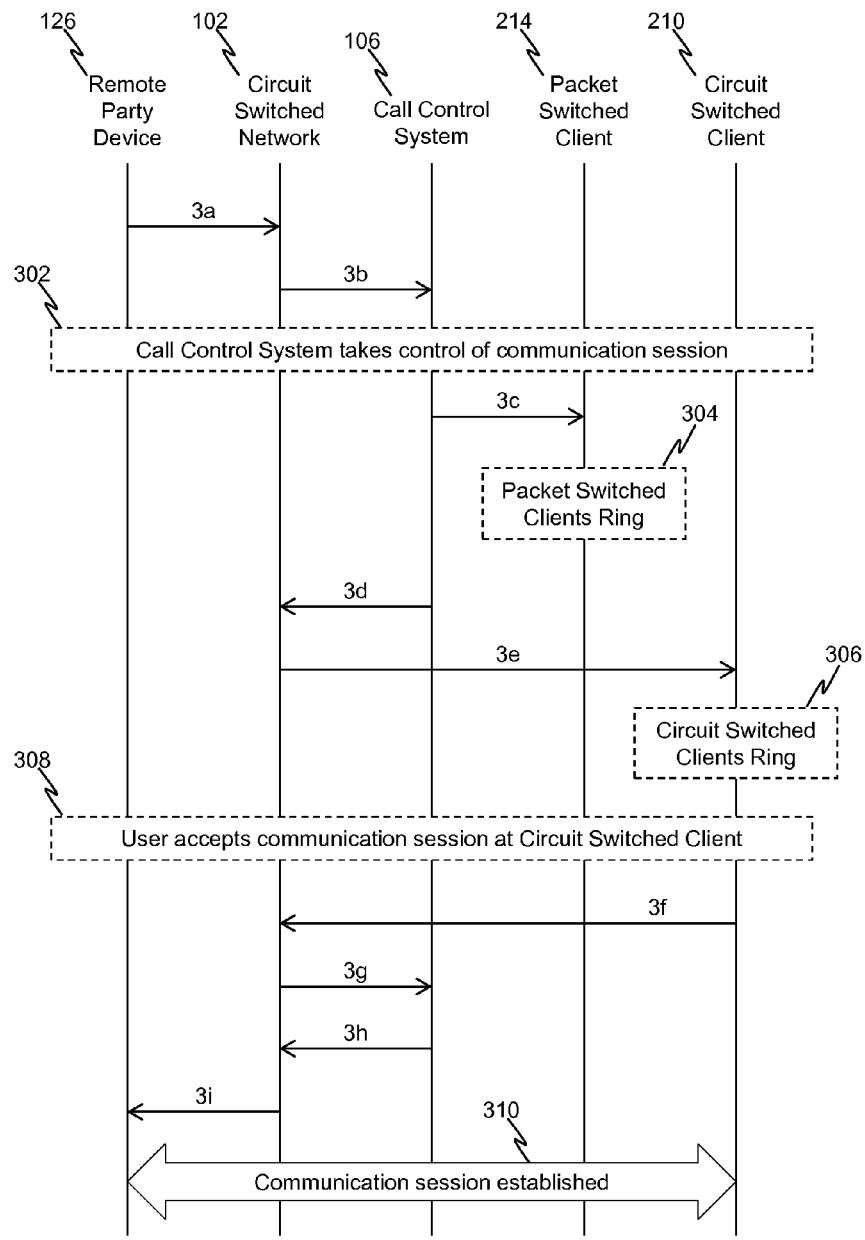
FIG. 3 shows a signalling message flow diagram describing the operation of the telecommunications network for providing a client-shared telephony service according to embodiments.

FIG. 3 shows a signalling message flow diagram describing the operation of telecommunications network 100 of FIG. 1 for providing a client-shared telephony service according to embodiments. In the embodiments shown in FIG. 3, the user's communication clients include a number of circuit-switched clients, including at least circuit-switched client 210 and a number of packet-switched clients, including at least packet-switched client 214. Circuit-switched client 210 and packet-switched client 214 may be equipped to different communication devices, or to the same communication device as shown in relation to FIG. 2.

At step 3a, a communication session setup request to the client-shared dialling number is transmitted by a communication client on remote party device 126. The communication setup request of step 3a may pass through a number of further entities or network parts (not shown) between remote party device 126 and circuit-switched network 102, such as one or more telephone switches. Circuit-switched network 102 has been configured to route communication session signalling data relating to the client-shared dialling number to call control system 106, and contacts call control system 106 with appropriate communication session signalling data accordingly in step 3b. Upon receipt of the communication session signalling data of step 3b, call control system 106 takes control of the communication session, as shown by item 302.

At step 3c, call control system 106 transmits communication session setup requests to the user's one or more packet-switched communication clients, including at least packet-switched communication client 214, via packet-switched network 104. Upon receipt of such communication session setup requests, the user's packet-switched communication clients will, unless unavailable, alert the user as to the request for incoming communication as shown by item 304. Such alert will involve activating one or more alert functions on the appropriate device, such as ring and/or vibrate functions. Similarly, at step 3d, call control system 106 transmits communication session setup requests via circuit-switched network 102 to the user's circuit-switched clients, including at least circuit-switched communication client 210, in step 3e. Upon receipt of such communication session setup requests, the user's one or more circuit-switched communication clients will, unless unavailable, alert the user accordingly, as shown by item 306.

The result of steps 3a to 3e is that all of the user's (available) communication clients will ring, allowing the user to select at which communication client (and therefore via which associated access technology) on which device to accept the received communication session setup request and hence conduct a communication session on.

In the embodiments depicted in FIG. 3, the user accepts the communication session setup request at circuit-switched communication client 210, at step 308, by entering appropriate user input e.g. by pressing an answer key via a user interface on the device on which circuit-switched communication client 210 is deployed. This results in a communication session setup response message (in this case an acceptance response message) being transmitted from circuit-switched communication client 210 back to call control system 106 via circuit-switched network 102, as shown by steps 3f and 3g. Call control system 106 then transmits a communication session setup response (acceptance) message back to remote party device 126 via circuit-switched network 102, as shown by steps 3h and 3i. Having completed the end-to-end communication session setup signalling flow, a communication session is established between remote party device 126 and circuit-switched communication client 212 as shown by item 310.

Note that in the embodiments depicted in FIG. 3, the user chose to accept the communication session setup request such that an acceptance response message was generated by the user communication client in question. If the user had chosen to reject the communication session setup request, then the user communication client in question would have generated a rejection response message and a communication session would not have been established with remote party device 126.

In the embodiments depicted in FIG. 3, all of the user's available devices were caused to ring. However, in alternative embodiments, the user may have configured a number of call initiating preferences for defining complex ringing scenarios, which might, for example, define a subset of a user's communication clients which should be used to initiate calls to under specific conditions. These user configurable preferences may also be stored in user database 128 as part of the user profile for each user. For example, a user may wish to configure their user preferences such that calls are not initiated to their desk phone at the office if it is later than 6 pm or during the weekend, or that calls are not initiated to their home phone between 9 am and 7 pm on weekdays.

Communication session setup requests can be directed to a specific user client in a number of ways. According to some embodiments, the communication session setup requests can be routed to a client on the basis of the unique identifier for that client. According to other embodiments, the communication session setup request is transmitted to all of a user's clients, but with the identifiers of the targeted clients included as an additional parameter. In these embodiments, when a client receives the communication session setup request, it checks its own identifier against the included identifiers in the additional parameter, and only alerts the user to the communication session setup request if there is a matching identifier.

In embodiments, established communication session 310 consists of multiple communication session legs. A communication session leg is a subset of the established communication session that spans only a part of a communication session path. For example, communication session 310 may comprise one communication session leg between remote party device 126 and call control system 106, and another communication session leg between call control system 106 and a user communication client 108. This allows call control system 106 to maintain its presence on the communication session path and provide additional features or call services if required. Each of the communication session legs between call control system 106 and the remote party device communication client may actually be subdivided into a number of further legs, but will be discussed henceforth as a single leg for the sake of simplicity. Further, the communication session legs need not connect to the same node in call control system 106 and may be bridged by one or more further legs in order to provide the required end-to-end communications.

According to some embodiments, packet-switched client 214 and circuit-switched 210 are equipped to the same communication device associated with the user, as depicted in FIG. 2. In embodiments where the user has such co-located communication clients, it is an undesirable user experience for both communication clients to exhibit ringing behaviour simultaneously. Such simultaneous ringing behaviour might confuse the user of the user device, or even result in unreliable operation of the user device. Advantageously, the present disclosure provides a number of systems and methods for handling the ringing behaviour of co-located communication clients in such a way as to provide a more desirable user experience. According to embodiments, elements of telecommunications network 100 are configured to cause co-located clients associated with a user of the client-shared telephony service, to exhibit a single ringing alert when a communication session setup request is directed to the client-shared dialling number. Operation of some such embodiments of the present disclosure will now be described in relation to FIG. 4.

Figure 4:
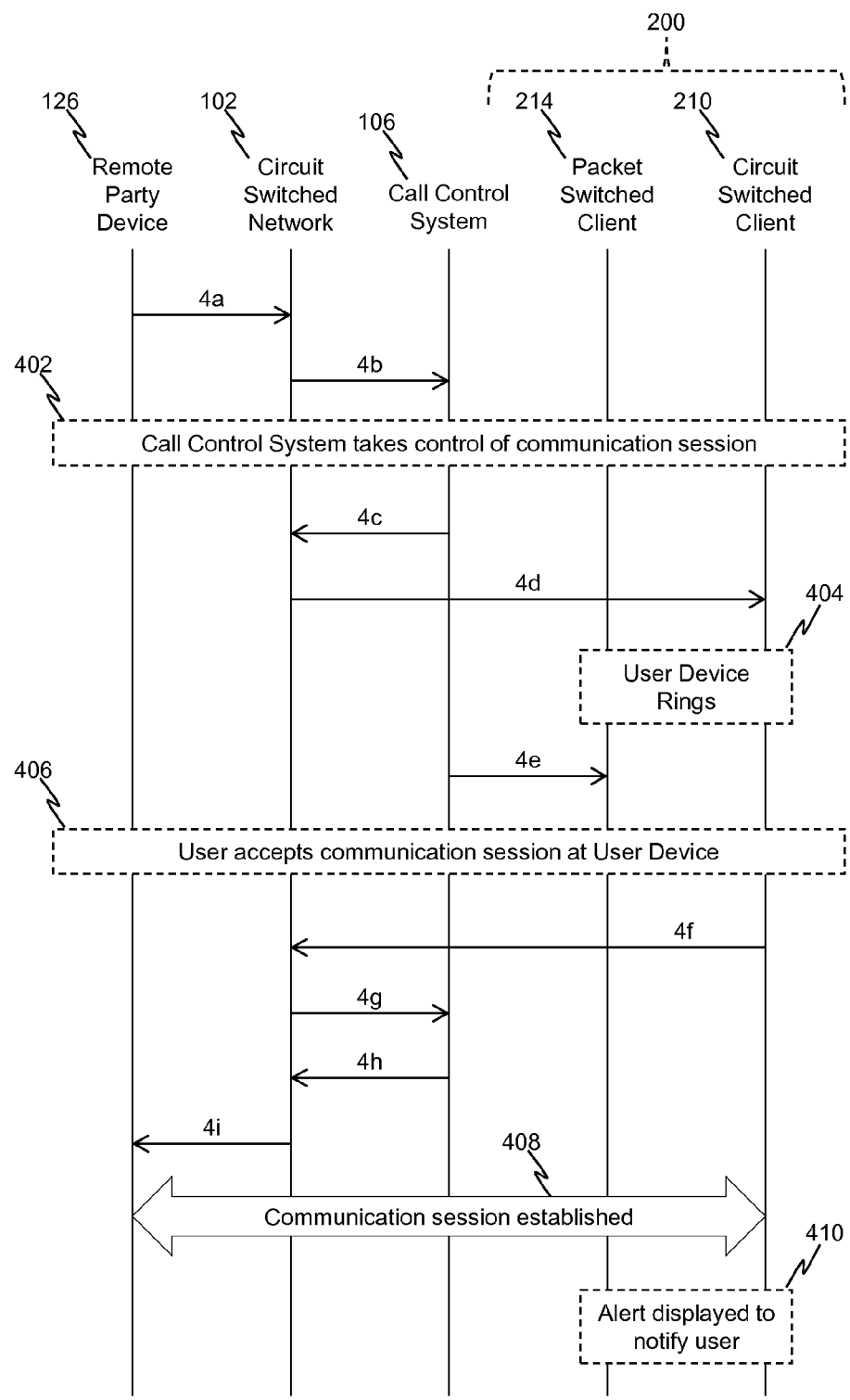
FIG. 4 shows a signalling message flow diagram describing the operation of the telecommunications network for controlling a communication session according to embodiments.

FIG. 4 shows a signalling message flow diagram describing the operation of telecommunications network 100 of FIG. 1 for controlling user device 200, which is equipped with at least two communication clients associated with the user of the client-shared telephony service. According to the embodiments shown in FIG. 6, user device 200 is equipped with at least packet-switched communication client 214 and circuit-switched communication client 210.

At step 4a, a communication session setup request to the client-shared dialling number is transmitted by a communication client on remote party device 126. The communication setup request of step 4a may pass through a number of further entities or network parts (not shown) between remote party device 126 and circuit-switched network 102, such as one or more telephone switches. Circuit-switched network 102 has been configured to route communication session signalling data relating to the client-shared dialling number to call control system 106, and contacts call control system 106 with appropriate communication session signalling data accordingly in step 4b. Upon receipt of the communication session signalling data of step 4b, call control system 106 takes control of the communication session, as shown by item 402.

Having taken control of the call, at step 4c, call control system 106 transmits communication session setup requests via circuit-switched network 102 to the user's circuit-switched clients, including at least circuit-switched communication client 210 in step 4d. Upon receipt of the communication session setup request at circuit-switched communication client 210, user device 200 rings accordingly, as shown by item 404. Such a ringing behaviour may involve activating one or more ringing functions that the user device is capable of exhibiting, including audio, visual or tactile.

Similarly, at step 4e, call control system 106 transmits communication session setup requests to the user's packet-switched communication clients, including at least packet-switched communication client 214, via packet-switched network 104. According to some embodiments, upon receipt of the communication session setup request at packet-switched communication client 214, user device 200 detects that it is already ringing, and takes no further action to provide additional ringing functions. According to other embodiments, upon receipt of the communication session setup request at packet-switched communication client 214, user device 200 detects that it is already ringing, and modifies the exhibited ringing functions to represent the additional received communication session setup request.

The result of steps 4a to 4e is that communication session setup requests have been received at both communication clients equipped to user device 200. According to some embodiments, the user device only offers a single answering mechanism to the user of the device, such as the lifting of a handset or the pressing of an answer button on the user device. According to such embodiments, in response to the user accepting the communication session via the offered answering mechanism, the user device then selects which communication client, and therefore via which communication interface, to accept the communication session setup request. This decision could be made on the basis of a preconfigured user preference, such as to always answer via a given client where possible, or on the basis of one or more measured conditions, such as communication link quality, or remaining battery life etc. According to alternative embodiments, the user device offers multiple choices of answering mechanism to the user of the device, such as press a first button to accept the communication session via one communication client, or press a second button to accept the communication session via another communication client.

In the embodiments illustrated in FIG. 4, the user accepts the communication session at user device 200, as shown by step 406, and a decision is made to accept the communication session via the circuit-switched client (according to one of the decision making procedures described above). This results in the transmission of a communication session setup response message (in this case an acceptance response message) being transmitted from circuit-switched communication client 210 back to call control system 106 via circuit-switched network 102, as shown by steps 4f and 4g. Call control system 106 then transmits a communication session setup response (acceptance) message back to remote party device 126 via circuit-switched network 102, as shown by steps 4h and 4i. Having completed the end-to-end communication session setup signalling flow, a communication session is established between remote party device 126 and circuit-switched communication client 212 as shown by item 410.

At step 410 user device 200 leverages knowledge of receipt of the communication session setup request received via the packet-switched interface at step 4e to provide an alert to the user that packet-switched communication client 214 is also available for conducting the given communication session via a packet-switched communication interface. This could be any kind of alert or notification that user device 200 is capable of exhibiting, including audio, visual or tactile.

According to some embodiments, user device 200 is configured to wait until the communication session is established between remote party device 126 and one of the communication clients before displaying alert 410. In this way, it is possible to ensure that the alerting function does not interfere with the ringing operation of user device 200, nor provide a confusing user experience for the user. In order to provide this behaviour, in some embodiments, user device 200 determines whether there is an established communication session in progress via either of the communication clients. In some such embodiments, this is determined via a suitable request-response protocol, such as an application peripheral interface (API) to the communication clients. In other such embodiments, this is determined as a result of a reporting process undertaken by each of the communication clients.

According to some embodiments, once one of the communication clients has received a communication session setup request, it determines whether the other co-located communication client has entered a communication session and if so, triggers the alerting function. This determination could be performed immediately upon receipt of one of the communication session setup requests, after a single predetermined period of time, or periodically subsequent to receipt of the communication session setup request. In embodiments, the timing is measured by a timer function on user device 200. According to other embodiments, once one of the communication clients has received the communication session setup request, it reports this to the other co-located communication client which can then trigger the alerting function once/if it establishes the communication session (or has done so already).

According to some embodiments, circuit-switched network part 102 and packet-switched network part 104 may have different associated propagation times for communicating messages between call control system 106 and the associated communication interfaces on user device 200. This might occur due to high volumes of network traffic being experienced by one of the network parts, the length of the routes taken via the different network parts, or as a result of the underlying transport technology deployed in the different network parts. As a result, the communication session setup requests transmitted from call control system 106 to user device 200 may arrive at substantially different times. According to some such embodiments, one of the communication session setup requests may arrive at user device 200 after the communication session has been established via the other collocated client. In such embodiments, having determined that the co-located client is participating in an the established communication session, receipt of the latter received communication session setup request is used to trigger the activation of the alert function immediately, in order to alert the user of user device 200 to the availability of the associated communication interface.

According some embodiments, the latter received communication session setup request is inspected to determine whether it relates to the same communication session as the earlier received communication session setup request before triggering the activation of the alert function. According to some embodiments, this is performed by comparing a communication session identifier of the latter received communication session setup request to a communication session identifier of an earlier received communication session setup request. If the latter received communication session setup request does relate to the same communication session as the earlier received communication session setup request, the alert function is triggered as described above. However, if the latter received communication session setup request does not relate to the same communication session as the earlier received communication session setup request, the latter received communication session setup request is handled as relating to a new incoming communication session, for example by triggering appropriate ringing or call waiting behaviour on user device 200.

The result of step 410 is that despite the communication session having been set up with circuit-switched communication client 210, via the circuit-switched communication interface, the user is alerted to the availability of packet-switched client 214 for conducting the given communication session via the corresponding packet-switched interface. This may be of interest to the user, as conducting the call via the packet-switched interface may provide additional services such as higher media quality, multimedia communications, cheaper calling rates etc. This may be of particular interest if the decision to establish the communication session with circuit-switched communication client 210, via the circuit-switched communication interface, was made by user device 200 and not the user.

In alternative embodiments, the decision is made to establish the communication session with packet-switched client 214 via the packet switched communication interface, and hence the user is subsequently alerted to the availability of circuit-switched client 210 for conducting communications via the circuit-switched communication interface in a similar manner to the operation of FIG. 4. This may be of interest to the user, as conducting the call via the circuit-switched interface may provide additional benefits such as improved mobility, more reliable communications, cheaper calling rates etc. Again, this may be of particular interest if the decision of which of the co-located communication clients to establish the communication session via was made by user device 200 and not the user.

Whilst in the embodiments described above in relation to FIG. 4 user device 200 is equipped with a packet-switched client (214) and associated packet-switched interface, and a circuit-switched client (210) and associated circuit-switched interface, according to other embodiments, user device 200 is equipped with two co-located packet-switched clients or two co-located circuit-switched clients, and the corresponding communication interfaces.

In the embodiments described above, the decision of which communication client should be used to accept the communication session setup request is performed at user device 200, either on the basis of a preconfigured setting, a measured characteristic, or on the basis of user input. In alternative embodiments, this decision is performed at call control system 106. In such embodiments, user database 128 comprises a list of identifiers for a number of communication clients associated with a given user, as well as data associated with the device that each client is equipped to. On this basis, by querying user database 128, call control system 106 can determine whether one or more of the clients associated with that user are co-located on a given device. Hence, in such embodiments, when a communication session setup message directed to the client-shared dialling number is received by call control system 106, having identified that at least two of the communication clients associated with the corresponding user of the client-shared telephony service are co-located on the same user device, call control system 106 can transmit communication session setup requests to only one of the identified communication clients.

According to some such embodiments, user database 128 further comprises data relating to the availability of the various communication clients associated with the user. Where only one of the identified communication clients is available, the communication session setup request is transmitted to that client. Where both one of the identified communication clients are available, call control system 106 decides which of the co-located communication clients to transmit the communication session setup request to, either on the basis of a preconfigured setting or a measured characteristic. In such cases a communication session information message is transmitted to the other, co-located communication client instead, which does not trigger ringing behaviour at the corresponding user device. Both a communication session setup request and a communication session information message fulfil the function of providing a communication availability notification, as the receipt of either at a communication client informs that communication client that the corresponding communication interface is able for conducting communications with call control system 106. For example, if call control system 106 determines that the communication session setup request should be transmitted to the co-located circuit-switched client 210 only (as per steps 4*c* and 4*d*), then a communication session information message is transmitted to packet-switched client 214 in step 4*e*, instead of a further communication session setup request as per the previously discussed embodiments. Hence, according to such embodiments, it is on the basis of the received communication session information message that the alert function is triggered, 410.

According to embodiments, user device 200 is configured to allow the user to respond to the displayed alert, for example in the form of additional user input via a user interface on user device 200, whereby to effect a transfer of the established communication session from the communication client currently involved in the given communication session, to the co-located communication client with respect to which the alert was displayed. Operation of such embodiments of the present disclosure will now be described in relation to FIG. 5.

Figure 5:
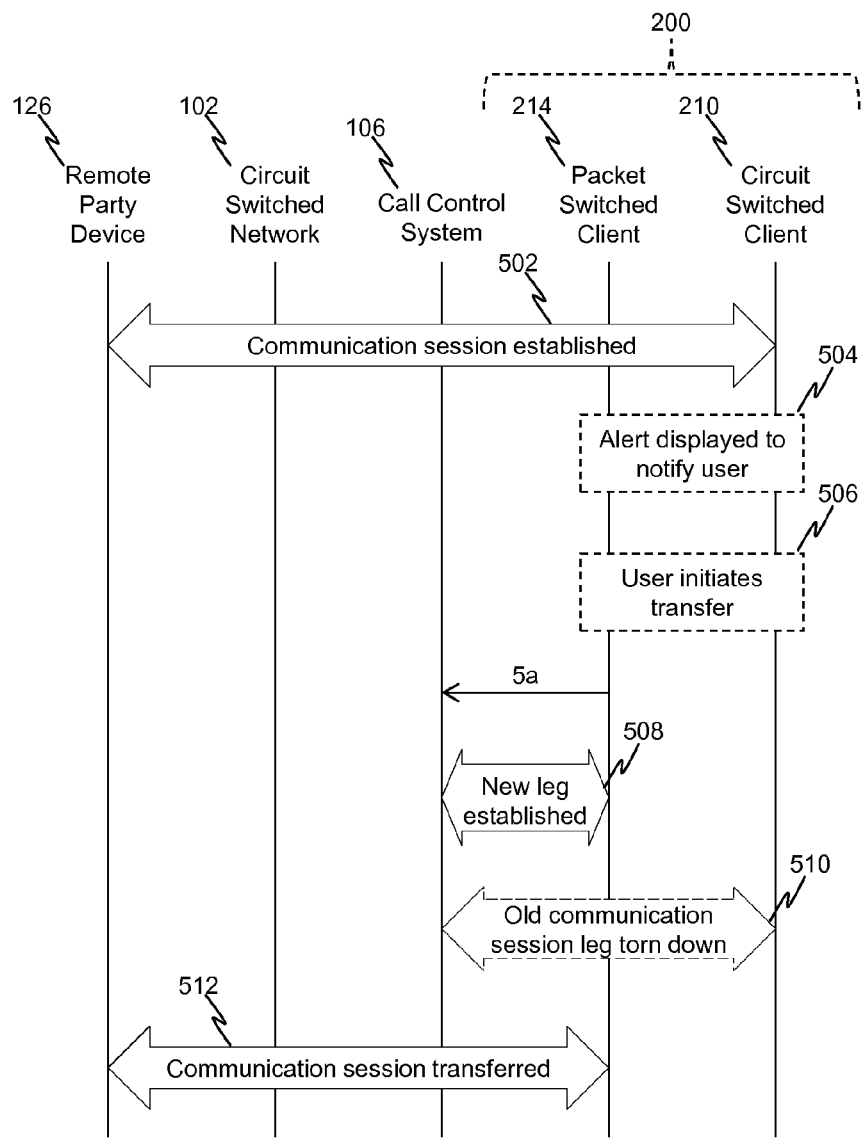
FIG. 5 shows a signalling message flow diagram describing the operation of the telecommunications network for controlling a communication session according to further embodiments.

FIG. 5 shows a signalling message flow diagram describing the operation of telecommunications network 100 of FIG. 1 for controlling an established communication session between a communication client on remote party device 126 and one of a plurality of communication clients on user device 200 associated with a user of the client-shared telephony service. According to the embodiments shown in FIG. 5, at the start of the signalling message flow diagram there is an established communication session in progress between remote party device 126 and circuit-switched client 210 on user device 200, as shown by 502, and an alert 504 is being displayed via user device 200 to alert the user to the availability of the packet-switched communication interface for conducting the given communication session. In the embodiments shown in FIG. 5, alert 504 is being displayed on the basis of an earlier received communication session setup request received at packet-switched communication client 214 via the associated packet-switched communication interface, as described previously in relation to FIG. 4.

The established communication session can be considered to comprise a number of communication session legs, including a communication session leg between circuit-switched client 210 and an intermediate node in the telecommunications network, and a communication session leg between remote party device 126 and an intermediate node in the telecommunications network. According to the embodiments shown in FIG. 5, the, or each, intermediate node is represented by, or within, call control system 106 (and may correspond to one or more of the different entities comprised therein). As described in relation to FIG. 1, the entities comprised by call control system 106 may be located within circuit-switched network part 102 and/or packet-switched network part 104 or one or more other networks (not shown).

At step 506, the user responds to the displayed alert, for example by making a user input via a user interface on user device 200. This results in a communication session acceptance message being transmitted from packet-switched client 214 to call control system 106 via packet-switched network part 104, as shown by step 5*a*.

After receiving the communication session acceptance message in step 5*a*, call control system 106 establishes a new communication session leg between an intermediate node in the telecommunications network and packet-switched client 214, as shown by step 508. This new communication session leg between packet-switched client 214 and the intermediate node forms a part of the established communication session with remote party device 126. Having established the new communication session leg between packet-switched client 214 and the intermediate node, call control system 106 performs the additional step of tearing down the communication session leg circuit-switched client 210 and an intermediate node in the telecommunications network, as shown by step 510.

The result of the above steps is to transfer the established communication session between the communication client on remote party device 126 and circuit-switched client 210, to packet-switched client 214 instead, thereby routing the communication session via the packet-switched interface on user device 200 instead of the circuit-switched interface as originally established, as shown by step 512.

In the embodiments described in relation to FIG. 5, the communication session was initially established with a circuit-switched client associated with the user, and subsequently transferred to a packet-switched client associated with the user. However, the operation of the disclosed embodiments is applicable to any combination of circuit and/or packet-switched initial and subsequent communication clients. For example, the communication session may be initially established with packet-switched communication client 214 via the packet-switched communication interface, and subsequently transferred to circuit-switched communication client 210 via the circuit-switched communication interface in on the basis of user input given in response to the displayed alert message. By further example, a communication session initially established with a packet-switched communication client may be subsequently transferred to a further packet-switched communication client, or a communication session initially established with a circuit-switched communication client may be subsequently transferred to a further circuit-switched communication client.

In some embodiments, it may not be appropriate for user device 200 to initiate the communication session transfer by transmitting communication session acceptance message in step 5a. For example, the communication session setup request message previously received at packet-switched client 214 may have timed-out, or been revoked as a result of the communication session being established at step 502. Alternatively, packet-switched client 214 may have received a communication session information message instead of a communication session setup request, in which case, there is not a communication session setup request for which to accept. Operation of such embodiments of the present disclosure will now be described in relation to FIG. 6.

Figure 6:
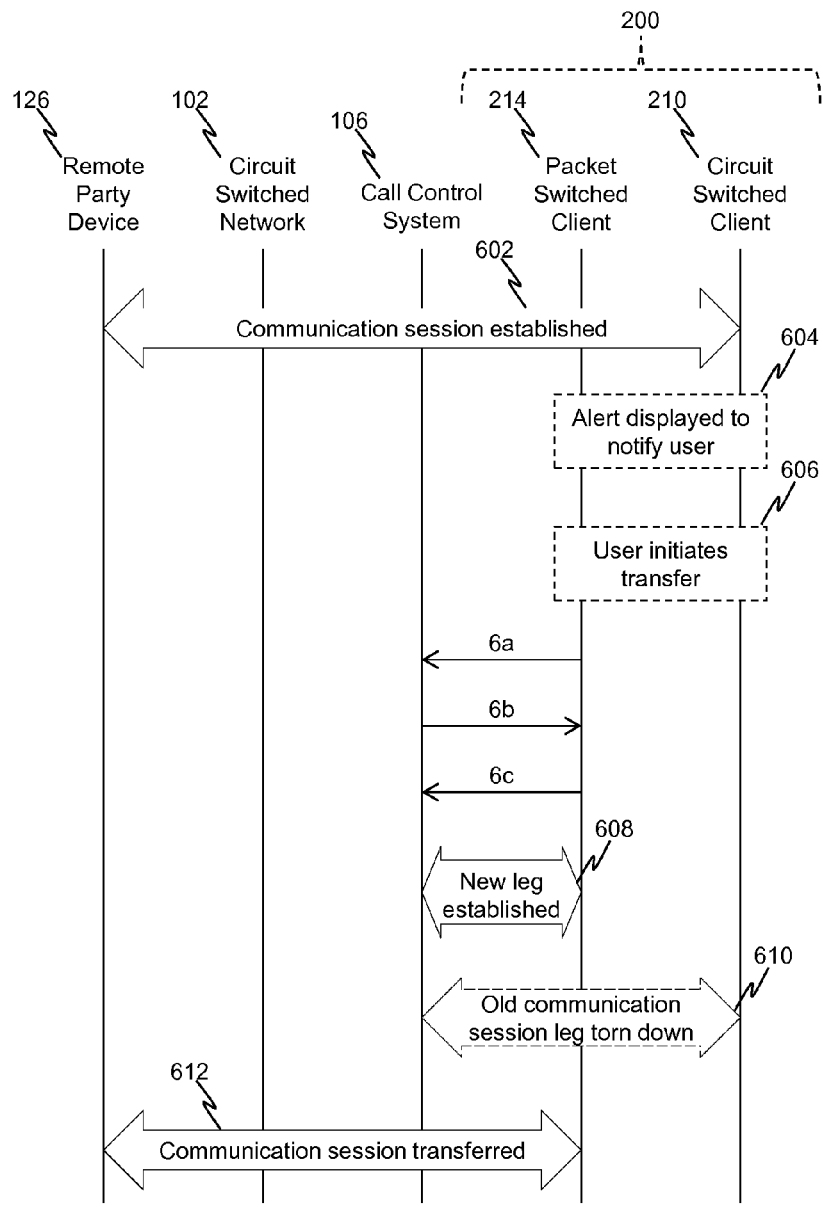
FIG. 6 shows a signalling message flow diagram describing the operation of the telecommunications network for controlling a communication session according to yet further embodiments.

FIG. 6 shows a signalling message flow diagram describing the operation of telecommunications network 100 of FIG. 1 for controlling an established communication session between a communication client on remote party device 126 and one of a plurality of communication clients on user device 200 associated with a user of the client-shared telephony service. According to the embodiments shown in FIG. 6, at the start of the signalling message flow diagram there is an established communication session in progress between remote party device 126 and a circuit-switched client 210 on user device 200, as shown by 602, and an alert 604 is being displayed via user device 200 to alert the user to the availability of the packet-switched communication interface for conducting the given communication session. In the embodiments shown in FIG. 6, alert 604 is being displayed on the basis of an earlier received communication session information message, received at packet-switched communication client 214 via the associated packet-switched communication interface, as described previously in relation to FIG. 4.

At step 606, the user responds to the displayed alert, for example by making a user input via a user interface on user device 200. This results in communication session transfer request being transmitted from packet-switched client 214 to call control system 106 via packet-switched network part 104, as shown by step 6a. After receiving the communication session acceptance message in step 6a, call control system 106 responds by transmitting a subsequent communication session setup request to packet-switched client 214 in step 6b. The subsequent communication session setup request is accepted by transmitting a communication session acceptance message from packet-switched client 214 to call control system 106 in step 6c.

According to some embodiments, user device 200 is configured to accept the subsequent communication session setup request without requiring further input from the user. According to some such embodiments, user device 200 is further configured to verify that the subsequent communication session setup request relates to the established communication session before transmitting the communication session acceptance message in step 6c. In some such embodiments, the subsequent communication session setup request includes an identifier for the established communication session, which, when received by the communication client on the user device, is compared to a known communication session identifier for the communication session established with the co-located communication client. If the identifiers match, then the communication session setup is automatically accepted. In other such embodiments, the communication session setup request includes an identifier for the targeted communication client, which, when received by that communication client on the user device, is compared its own communication client identifier. If the identifiers match, then the communication session setup is automatically accepted.

After receiving communication session acceptance message in step 6c, call control system 106 establishes a new communication session leg between an intermediate node in the telecommunications network and packet-switched client 214, as shown by step 608. According to some embodiments, this new communication session leg between packet-switched client 214 and the intermediate node forms a part of the established communication session with remote party device 126. According to other embodiments, a bridging operation is required to connect the new communication session leg to the previously established communication session leg between remote party device 126 and the intermediate node in the telecommunications network. Having established the new communication session leg between packet-switched client 214 and the intermediate node, call control system 106 performs the additional step of tearing down the communication session leg circuit-switched client 210 and an intermediate node in the telecommunications network, as shown by step 610. The result of the above steps is to transfer the established communication session between the communication client on remote party device 126 and circuit-switched client 210, to packet-switched client 214 instead, thereby routing the communication session via the packet-switched interface on user device 200 instead of the circuit-switched interface as originally established as shown by step 612.

Figure 7:
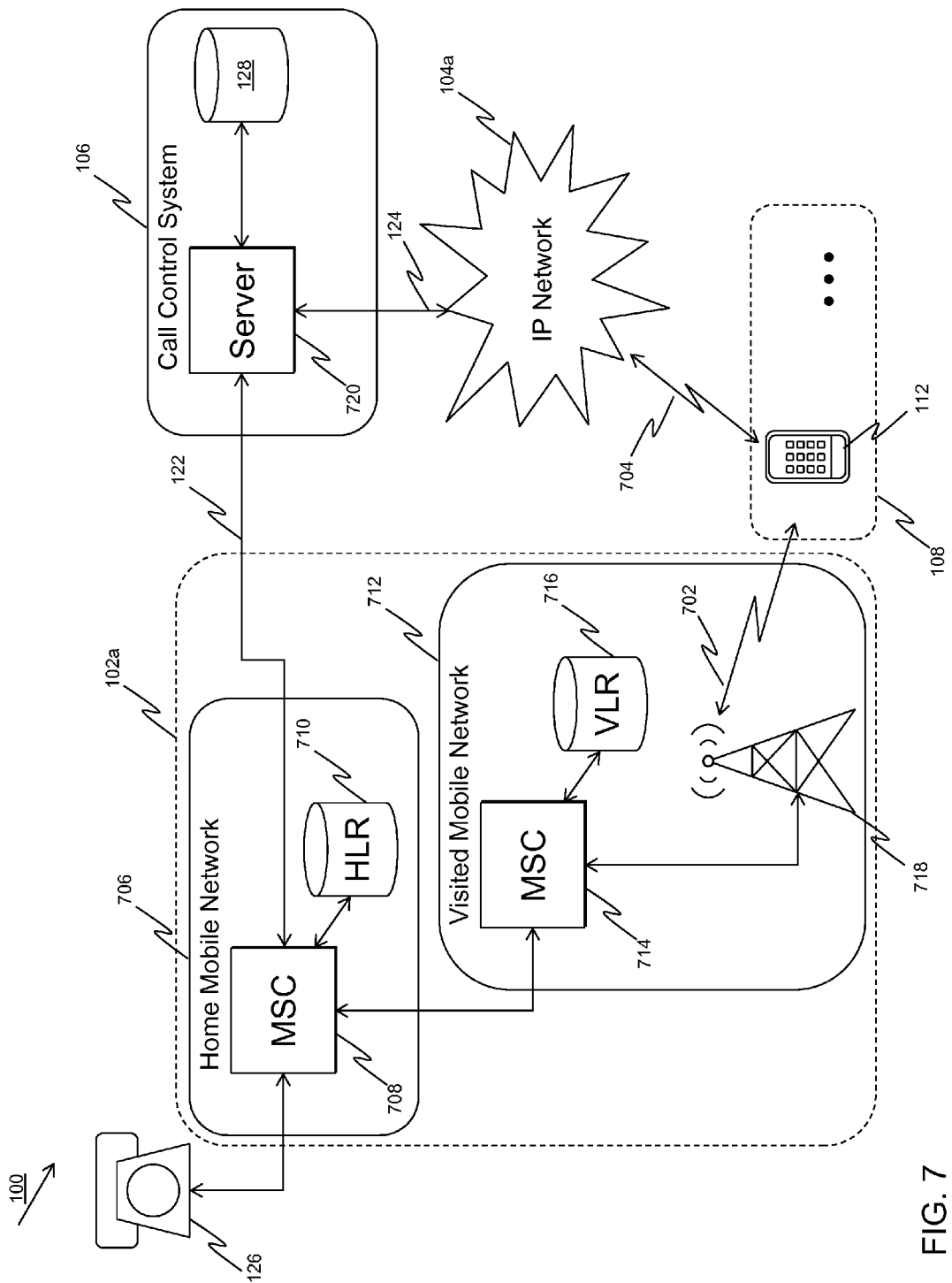
FIG. 7 shows the telecommunications network depicted in FIG. 1 in more detail according to embodiments.

FIG. 7 shows telecommunications network 100 depicted in FIG. 1 in more detail according to embodiments; in such embodiments, circuit-switched network part 102 comprises a mobile (or 'cellular') telephony network part 102a, and packet-switched network part 104 comprises IP network part 104a. A client-shared telephony service is hosted and controlled by a call control system 106.

According to the embodiments shown in FIG. 7, a user of the client-shared telephony service has a number of devices 108 associated with their client-shared dialling number through which they may conduct communications via the service. The user's associated devices include, at least, mobile telephone 112. Mobile telephone 112 is equipped with a cellular radio telephony interface and circuit-switched communications client for conducting communications in telecommunications network 100 via radio link 702 with mobile telephony network part 102a. Mobile telephone 112 is also equipped with at least one wireless packet-switched interface and packet-switched communications client for conducting communications in telecommunications network 100 via radio link 704 with IP network part 104a. This wireless packet-switched interface could comprise a short-range radio interface such as WiFi or Bluetooth, and/or an interface for communication of packet data over a mobile network, such as LTE-A, HSPA, W-CDMA or Mobile WiMax. In such embodiments where mobile telephone 112 is equipped with multiple communication clients, the communication clients can be referred to as co-located communication clients.

Mobile telephony network part 102a allows for provision of telephony services to a number of mobile telephones, although only the user's mobile telephone 710 is depicted. Mobile telephony network part 102a comprises home mobile network part 706, which is generally associated with mobile telephone 112. Communication sessions initiated to a telephone dialling number associated with mobile telephone 112, e.g. a Mobile Station International Subscriber Directory Number (MSISDN), are routed to home mobile network part 706 for processing as a result of that general association. Home mobile network part 706 comprises mobile switching centre (MSC) 708 and home location register (HLR) 710. HLR 710 comprises a database which provides MSC 708 with data relating to users generally associated with home mobile network 706 upon request, such as the location of their mobile telephones and any configuration data (such as call routing triggers, billing information etc.).

Mobile telephony network part 102a also comprises visited mobile network part 712, which is transiently associated with mobile telephone 112. Visited mobile network part 712 comprises serving MSC 714, Visitor Location Register (VLR) 716 and base transceiver station (BTS) 718. BTS 718 transmits radio signals to, and receives radio signals from, the circuit-switched communications client and cellular radio telephony interface on mobile telephone 112 and radio communication link 702. It is this communication relationship that provides the transient association between mobile telephone 112 and visited mobile network part 712. Mobile telephone 112 is located in an area (commonly known as a 'cell') served by BTS 718. BTS 718 may be controlled by a base station controller (BSC; not shown), which may also control a number of further BTSs (also not shown), which in combination with a number of further BSCs and BTSs, may provide a large number of geographically distributed cells served by MSC 714.

When mobile telephone 112 associates with serving MSC 714 (e.g. by entering a cell served by MSC 714), serving MSC 714 informs home MSC 708, which in turn updates HLR 710 with the location of mobile telephone 112. In this way, HLR 710 is kept up to date with the most recent location of mobile phone 112. Additionally, any configuration data relating to mobile telephone 112 is copied into VLR 716. This allows calls placed by the circuit-switched client on mobile telephone 112 while being served by serving MSC 714 to be correctly handled according to the aforementioned configuration data.

Depending on the location of mobile telephone 112, home mobile network part 706 may also serve mobile telephone 112, in which case it will comprise the same network part as visited mobile network part 712.

According to embodiments, the client-shared telephony service is provided by associating one or more communication clients (including the packet-switched communication client on mobile telephone 112) with a telephone dialling number associated with the circuit-switched communication client on mobile telephony device 112, such as its MSISDN. This can be referred to as twinning the additional communication clients with the circuit-switched communication client. According to such embodiments, the client-shared dialling number is therefore the MSISDN of the circuit-switched communication client on mobile telephony device 112.

A communication session between a communication client on one of the user's devices 108 and a communication client on a device of a remote party 126 is routed between the remote party device 126 and home mobile network part 706 via one or more further network parts (not shown). In some embodiments, remote party device 126 is also a mobile telephone, in which case the communication session may be routed via one or more serving mobile network parts and home mobile network parts associated with the remote party device. These could be the same as mobile network parts 706 and/or 712, or further mobile network parts (not shown). In other embodiments, remote party device 126 is a fixed line circuit-switched telephone, such as a POTS telephone, in which case the communication session may be routed via the PSTN and one or more gateway entities, such as a gateway MSC, to convert between the various protocols and data formats used to transfer media data and signalling data in the PSTN and mobile telephony network part 102a. Home MSC 708 may fulfil the role of the gateway entity, or it may be fulfilled by another intermediate entity. In further alternative embodiments, remote party device 126 is an IP telephony device, such as SIP telephone, in which case the communication session may be routed via an IP network, such as the internet, and one or more gateway entities. Again, home MSC 708 may fulfil the role of the gateway entity, or it may be fulfilled by another intermediate entity.

A communication session between a communication client on one of the user's devices 108 and a communication client on remote party device 126 can be routed between mobile telephony network part 102a and call control system 106 via link 122, which could be, for example, a SIP trunk, or other high capacity communications link. In the embodiments shown in FIG. 7, home MSC 708 is shown as being the gateway entity between mobile network part 102a and call control system 106, however, this role could equally be performed by another entity in mobile network part 102a, such as serving MSC 714. Further, the links between IP network part 104a, call control system 106 and mobile telephony network part 102a may comprise one or more gateway or session border controller entities (not shown) which carry out conversion between the various protocols and data formats used to transfer media data and signalling data in the different networks making up telecommunications network 100.

In order to provide the client-shared telephony service, mobile telephony network part 102a is configured to route communication session setup, signalling and or/media data relating to one of the user's devices 108 via call control system 106. This can be achieved by configuring HLR 710 with one or more trigger conditions for communication session data relating to the client-shared dialling number, such that data originating from or directed to that dialling number results in appropriate communication session signalling data being sent to call control system 106. According to some embodiments, this could be a routing query to establish where the communication session data should be routed.

In other embodiments, the communication session data itself may be routed to call control system 106, which then handles the sending of communication session data to any appropriate further entities. In such embodiments, communication session data transmitted from call control system 106 to the circuit-switched client on mobile telephone 112 would be undesirably routed back to call control system 106 by mobile telephony network 102a if routed by conventional methods on the basis of the MSISDN of the circuit-switched client. There are several methods for overcoming this behaviour, for example, the transmitted data may include additional information to indicate that the triggers stored in HLR 710 should not be utilised, causing HLR 710 to return the location of the mobile telephone 112 instead of invoking the associated trigger. Alternatively, call control system may be adapted to query HLR 710 directly via a further interface (not shown) to obtain a temporary routing number (TRN) for communicating with the circuit-switched client on mobile telephone 112. Routing communications to the circuit-switched client on mobile telephone 112 via such a TRN would not invoke the triggers stored in HLR 710, as the client-shared dialling number is not used.

Call control system 106 comprises call control server 720, and user database 128. Call control server 720 is responsible for processing communication session data relating to the user, and is aided in doing so by user database 128. Call control system 106 may further comprise a media gateway controller, service platform, call agent, application server or softswitch and may perform other functions typically associated with such entities. The elements comprised by call control system 106 may be located within mobile telephony network part 102a and/or IP network part 104a, or one or more other networks (not shown).

Figure 8:
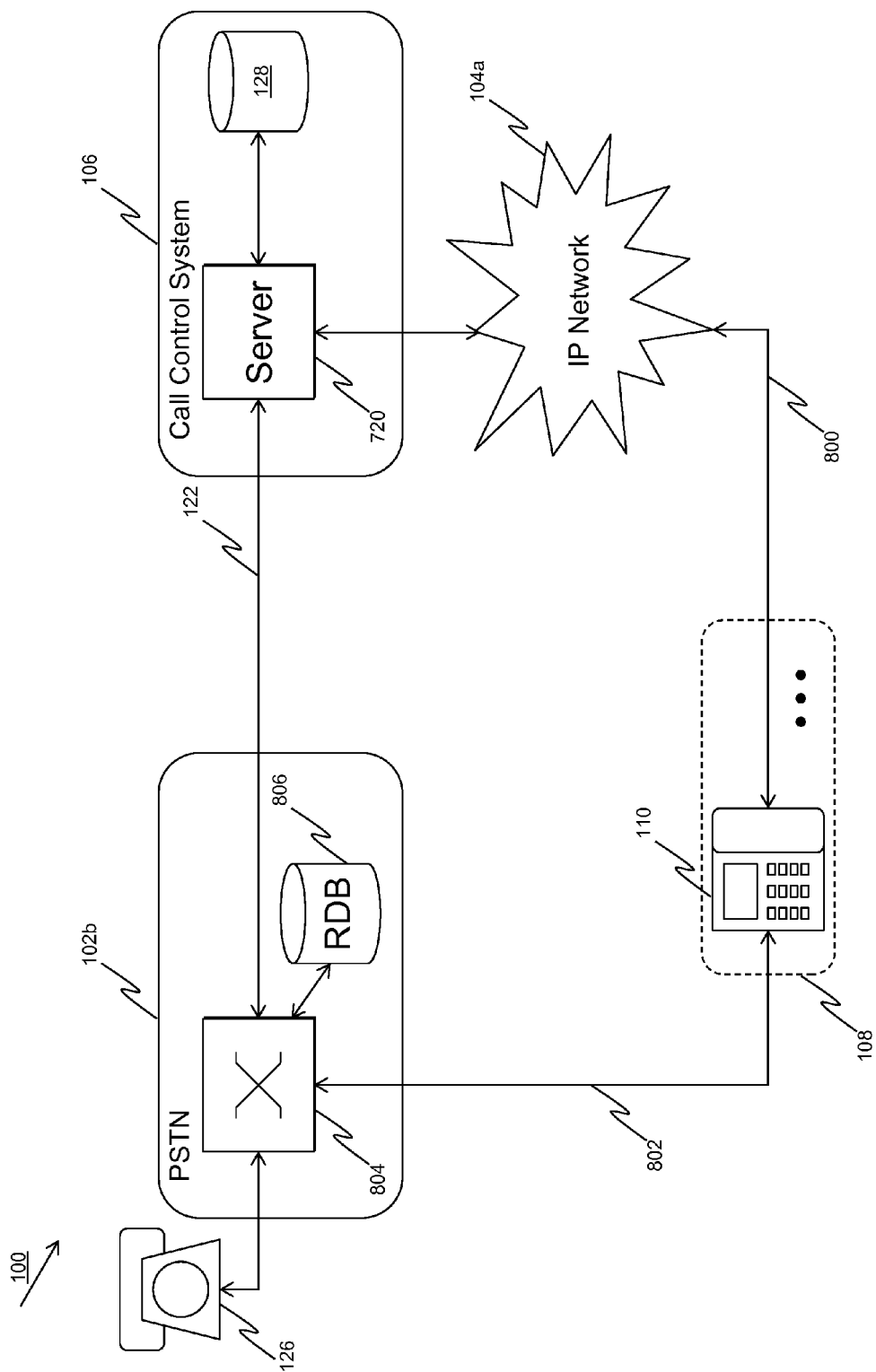
FIG. 8 shows the telecommunications network depicted in FIG. 1 in more detail according to further embodiments.

FIG. 8 shows telecommunications network 100 depicted in FIG. 1 in more detail according to embodiments; in such embodiments, circuit-switched network part 102 comprises a fixed line telephony network part 102b (such as the PSTN), and packet-switched network part 104 comprises IP network part 104a. A client-shared telephony service is hosted and controlled by a call control system 106, which comprises call control server 720 and user database 120, the functions of which are the same as described previously in relation to FIGS. 1 and 7.

Circuit-switched fixed line telephony network 102b comprises telephone switch 804 and routing database 806. Routing database 806 is queried by telephone switch 804 in order to establish how to route communication session data. As well as providing basic routing information, routing database 806 can be configured with a number of triggers in relation to certain calling or called parties. In embodiments of the present disclosure, routing database 806 is configured to route all communication session data either originating from, or directed to, one of the users devices 108 via call control system 106.

In the embodiment shown in FIG. 8, the user's communication devices 108 comprise at least desk phone 110. Desk phone 110 is configured with a fixed-line circuit-switched PSTN interface and a circuit-switched communication client for conducting communications in telecommunications network 100 via fixed-line link 802 with PSTN network part 102b. Desk phone 110 is also configured with a fixed-line packet-switched IP interface and a co-located packet-switched communication client for conducting communications in telecommunications network 100 via fixed-line link 800 with IP network part 104a. The packet-switched client on desk phone 110 has been configured into the client-shared telephony service with respect to a telephone dialling number associated with the circuit-switched client on desk phone 110. Again, this can also be described by referring to the packet-switched communication client on desk phone 110 as having been twinned with the circuit-switched client on desk phone 110.

The above embodiments are to be understood as illustrative examples of the invention. Further embodiments of the invention are envisaged. Whilst in the above embodiments, the user is alerted to the availability of a second communication interface based on receiving a communication notification relating to the second communication interface, a communication session may alternatively be transferred autonomously by the user device, without user intervention. Further, the invention may be implemented in an IP Multimedia Subsystem (IMS) telecommunications network. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling a user device in a telecommunications network, the method comprising:
   receiving, at the user device, a first communication session setup request to set up a given communication session, wherein the user device comprises at least a first communication interface capable of communicating via a first part of the telecommunications network and a second communication interface capable of communicating via a second, different part of the telecommunications network, and wherein the first communication session setup request is directed to the first communication interface;
   receiving, at the user device, a communication notification in relation to the same given communication session, the communication notification being directed to the second communication interface;
   establishing, at the user device, the given communication session via the first communication interface via the first part of the telecommunications network; and
   after having established the given communication session via the first communication interface, activating, at the user device, an alert function to alert a user of the user device to the availability of the second communication interface at least on the basis of having received the communication availability notification.

2. The method of claim 1, wherein the communication notification comprises a second communication session setup request to set up the same given communication session.

3. The method of claim 1, further comprising transmitting a response to the first communication session setup request, whereby to establish a communication session via the first part of the telecommunications network.

4. The method of claim 1, further comprising determining that a communication session has been established via the first part of the telecommunications network, wherein the alert mechanism is conditionally activated on the basis of the determination.

5. The method of claim 1, wherein the alert mechanism is activated in response to a timer function reaching a predetermined time threshold.

6. The method of claim 5, wherein the timer function is initiated in response to receipt of the first communication session setup request.

7. The method of claim 5, wherein the timer function is activated in response to receipt of the second communication session setup request.

8. The method of claim 1, further comprising:
   receiving, via a user interface of the user device, user input from the user associated with rerouting the communication session via the second part of the telecommunications network, and
   transmitting a communication session transfer request, the transmitted communication session transfer request being operable to transfer the established communication session from the first communication interface to the second communication interface.

9. The method of claim 8, further comprising receiving a subsequent communication session setup request to set up the same given communication session, the subsequent communication session setup request being directed to the second communication interface.

10. The method of claim 9, further comprising:
verifying that the subsequent communication session setup request relates to the given communication session, and transmitting a communication session acceptance message from the second communication interface in response to verifying that the subsequent communication session setup request relates to the given communication session.

11. The method of claim 10, wherein the verifying step comprises identifying, in the subsequent communication session setup request, an identifier associated with the given communication session.

12. The method of claim 10, wherein the verifying step comprises identifying, in the communication session setup request, an identifier associated the user device.

13. The method of claim 12, wherein the identifier is associated with a communication client equipped to the user device.

14. The method of claim 1, wherein the first communication interface and the second communication interface are associated with different access technologies.

15. The method of claim 1, wherein the first communication session setup request is directed to a first communication client associated with the first communication interface and the communication notification is directed to a second communication client associated with the second communication interface.

16. A system for use in controlling a user device in a telecommunications network, the user device comprising at least a first communication interface capable of communicating via a first part of the telecommunications network and a second communication interface capable of communicating via a second, different part of the telecommunications network, the system comprising:
a data store comprising executable software; and
at least one processor in data communication with the data store, the processor configured to execute the software and causes a computing device to:
receive a first communication session setup request to set up a given communication session, the first communication session setup request being directed to the first communication interface;
receive a communication notification in relation to the same given communication session, the communication notification being directed to the second communication interface;
establish the given communication session via the first communication interface via the first part of the telecommunications network; and
after having established the given communication session via the first communication interface, activate an alert function to alert a user of the user device to the availability of the second communication interface at least on the basis of having received the communication availability notification.

17. A non-transitory computer-readable storage medium having computer-executable instructions stored thereon which, when executed by a processor, cause a computing device to perform a method of controlling a user device in a telecommunications network, the method comprising:

receiving, at the user device, a first communication session setup request to set up a given communication session, wherein the user device comprises at least a first communication interface capable of communicating via a first part of the telecommunications network and a second, communication interface capable of communicating via a second, different part of the telecommunications network, and wherein the first communication session setup request is directed to the first communication interface;
receiving, at the user device, a communication notification in relation to the same given communication session, the communication notification being directed to the second communication interface;
establishing, at the user device, a the given communication session via the first communication interface via the first part of the telecommunications network; and
after having established the given communication session via the first communication interface, activating, at the user device, an alert function to alert a user of the user device to the availability of the second communication interface at least on the basis of having received the communication availability notification.

18. A method of controlling a given communication session in a telecommunications network between a first communication device associated with a first party and a second communication device associated with a second party, the method comprising:
receiving, at a call control system in the telecommunications network, from the second communication device, an initial communication session setup request to set up the given communication session;
in response to receipt of initial communication session setup request, transmitting, from the call control system in the telecommunications network, a first communication session setup request to set up the given communication session, the first communication session setup request being directed to a first communication interface on the first communication device, wherein the communication is capable of communication via a first part of the telecommunications network, and wherein the first communication device comprises at least the first communication interface and a second communication interface capable of communicating via a second, different part of the telecommunications network;
in response to receipt of the initial communication session setup request, transmitting, from the call control system in the telecommunications network a communication notification in relation to the same given communication session, the communication notification being directed to the second communication interface on the first communication device;
establishing, at a call control system in the telecommunications network, a first communication session leg between an intermediate node in the telecommunications network and the first communication device via the first communication interface and the first part of the telecommunications network;
after having established the first communication session leg to the first communication interface, receiving, at a call control system in the telecommunications network, a communication session transfer request; and
establishing, at a call control system in the telecommunications network, a second communication session leg between an intermediate node in the telecommunications network and the first communication device via the second communication interface and the second part of the telecommunications network in response to receiving the communication session transfer request.

19. The method of claim 18, wherein the communication notification comprises a second communication session setup request to set up the same given communication session.

20. The method according claim 19, further comprising establishing a third communication session leg between an intermediate node in the telecommunications network and the second communication device, the method comprising maintaining the third communication session leg subsequent receiving the communication session transfer request.

21. A method of controlling a user device in a telecommunications network, the method comprising:
receiving, at the user device, a first communication session setup request to set up a given communication session, wherein the user device comprises at least a first communication interface capable of communicating via a first part of the telecommunications network and a second communication interface capable of communicating via a second, different part of the telecommunications network, and wherein first communication session setup request is directed to the first communication interface;
receiving a communication notification in relation to the same given communication session, the communication notification being directed to the second communication interface;
establishing the given communication session via the first communication interface via the first part of the telecommunications network; and
after having established the given communication session via the first communication interface, transferring the given communication session to the second communication interface at least based on having received the communication availability notification, wherein transfer of the given communication session comprises;
transmitting a communication session transfer request, the transmitted communication session transfer request being operable to transfer the established communication session from the first communication interface to the second communication interface; and
receiving a subsequent communication session setup request to set up the same given communication session, the subsequent communication session setup request being directed to the second communication interface.

* * * * *